United States Patent
Kline et al.

(10) Patent No.: US 7,176,786 B2
(45) Date of Patent: Feb. 13, 2007

(54) METHOD OF ISOLATING DATA IN A POWER LINE COMMUNICATIONS NETWORK

(75) Inventors: Paul A. Kline, Gaithersburg, MD (US); William H. Berkman, New York, NY (US)

(73) Assignee: Current Technologies, LLC, Germantown, MD (US)

(*) Notice: Subject to any disclaimer, the term of this patent is extended or adjusted under 35 U.S.C. 154(b) by 0 days.

(21) Appl. No.: 10/899,926

(22) Filed: Jul. 27, 2004

(65) Prior Publication Data

US 2005/0007241 A1    Jan. 13, 2005

Related U.S. Application Data

(63) Continuation-in-part of application No. 09/765,910, filed on Jan. 19, 2001, now Pat. No. 6,977,578.

(60) Provisional application No. 60/177,237, filed on Jan. 20, 2000.

(51) Int. Cl.
G05B 11/01    (2006.01)

(52) U.S. Cl. .......................... 340/310.1; 340/310.13; 370/501

(58) Field of Classification Search ..............................
340/310.01–310.08, 310.11–310.18; 370/501, 370/502; 375/219, 258
See application file for complete search history.

(56) References Cited

U.S. PATENT DOCUMENTS

| | | | |
|---|---|---|---|
| 3,369,078 A | 2/1968 | Stradley | 381/2 |
| 3,810,096 A | 5/1974 | Kabat et al. | 340/147 R |
| 3,911,415 A | 10/1975 | Whyte | 340/310 |
| 3,942,168 A | 3/1976 | Whyte | 340/310.01 |
| 3,942,170 A | 3/1976 | Whyte | 340/310 |
| 3,944,723 A | 3/1976 | Fong | 178/3 |
| 3,964,048 A | 6/1976 | Lusk et al. | 340/310 R |
| 3,967,264 A | 6/1976 | Whyte et al. | 340/310.08 |
| 3,973,087 A | 8/1976 | Fong | 340/310.06 |
| 3,973,240 A | 8/1976 | Fong | 340/151 |
| 4,004,110 A | 1/1977 | Whyte | 340/310.07 |

(Continued)

FOREIGN PATENT DOCUMENTS

EP    0 141 673 A2    5/1985

(Continued)

OTHER PUBLICATIONS

Patent Abstracts of Japan, Japanese Publication No. 10200544 A2, published Jul. 31, 1998, (Matsushita Electric Works, LTD).

(Continued)

*Primary Examiner*—Phung T. Nguyen
(74) *Attorney, Agent, or Firm*—Mel Barnes; Capital Legal Group, LLC

(57) ABSTRACT

The present invention provides isolation between a power line local area network and another network such as a power line wide area network. In one embodiment of the present invention, a filter device is installed on the power line supplying power to a structure in which a power line local area network is present. The example filter device may comprise a controller configured to receive a control signal and to cause a switch to activate or deactivate a low pass filter for attenuating the data signals.

50 Claims, 11 Drawing Sheets

U.S. PATENT DOCUMENTS

| | | | |
|---|---|---|---|
| 4,004,257 A | 1/1977 | Geissler | 333/207 |
| 4,057,793 A | 11/1977 | Johnson et al. | 340/310 R |
| 4,060,735 A | 11/1977 | Pascucci et al. | 307/3 |
| 4,239,940 A | 12/1980 | Dorfman | 179/2.51 |
| 4,250,489 A | 2/1981 | Dudash et al. | 340/147 T |
| 4,475,209 A | 10/1984 | Udren | 375/214 |
| 4,580,276 A * | 4/1986 | Andruzzi et al. | 375/269 |
| 4,599,598 A * | 7/1986 | Komoda et al. | 340/310.02 |
| 4,638,298 A | 1/1987 | Spiro | 370/392 |
| 4,642,607 A | 2/1987 | Strom et al. | 340/310 |
| 4,683,450 A | 7/1987 | Max et al. | 333/202 |
| 4,766,414 A | 8/1988 | Shuey | 340/310 A |
| 4,772,870 A | 9/1988 | Reyes | 340/310 R |
| 4,815,106 A * | 3/1989 | Propp et al. | 375/257 |
| 4,903,006 A | 2/1990 | Boomgaard | 340/310 A |
| 5,066,939 A | 11/1991 | Mansfield, Jr. | 340/310 R |
| 5,257,006 A | 10/1993 | Graham et al. | 340/310 A |
| 5,319,634 A | 6/1994 | Bartholomew et al. | 370/18 |
| 5,355,109 A | 10/1994 | Yamazaki | 336/92 |
| 5,537,087 A | 7/1996 | Naito | 336/92 |
| 5,684,450 A | 11/1997 | Brown | 340/310.02 |
| 5,726,980 A | 3/1998 | Rickard | 370/293 |
| 5,777,769 A | 7/1998 | Coutinho | 359/173 |
| 5,818,821 A | 10/1998 | Schurig | 370/293 |
| 5,870,016 A | 2/1999 | Shrestha | 340/310.01 |
| 5,949,327 A | 9/1999 | Brown | 340/310.01 |
| 5,952,914 A | 9/1999 | Wynn | 340/310.01 |
| 5,978,371 A | 11/1999 | Mason, Jr. et al. | 370/389 |
| 5,994,998 A * | 11/1999 | Fisher et al. | 375/258 |
| 6,144,292 A | 11/2000 | Brown | 340/310.02 |
| 6,151,480 A | 11/2000 | Fischer et al. | 340/310.01 |
| 6,172,597 B1 | 1/2001 | Brown | 340/310.02 |
| 6,177,849 B1 | 1/2001 | Barsellotti et al. | 333/177 |
| 6,282,405 B1 | 8/2001 | Brown | 725/79 |
| 6,297,729 B1 | 10/2001 | Abali et al. | 340/310.01 |
| 6,335,672 B1 | 1/2002 | Tumlin et al. | 336/175 |
| 6,373,377 B1 * | 4/2002 | Sacca et al. | 340/310.01 |
| 6,417,762 B1 | 7/2002 | Comer | 340/310.01 |
| 6,590,493 B1 | 7/2003 | Rasimas | 340/310.01 |
| 6,624,745 B1 * | 9/2003 | Willer | 340/310.01 |
| 6,667,685 B2 | 12/2003 | Wasaki et al. | 340/310.03 |
| 6,737,984 B1 * | 5/2004 | Welles, II et al. | 340/870.02 |
| 6,771,775 B1 | 8/2004 | Widmer | 379/413.04 |
| 6,785,532 B1 | 8/2004 | Rickard | 455/402 |
| 6,842,459 B1 | 1/2005 | Binder | |
| 6,937,056 B2 | 8/2005 | Binder | |
| 6,952,159 B1 | 10/2005 | Müller | 340/310.08 |
| 6,956,464 B2 | 10/2005 | Wang et al. | 340/310.08 |
| 6,975,212 B2 | 12/2005 | Crenshaw et al. | 340/310.08 |
| 6,977,578 B2 | 12/2005 | Kline | 340/310.01 |
| 7,005,943 B2 | 2/2006 | Cern | |
| 2001/0045888 A1 | 11/2001 | Kline | 340/310.01 |
| 2002/0075097 A1 | 6/2002 | Brown et al. | 333/185 |
| 2002/0109585 A1 | 8/2002 | Sanderson | 340/310.01 |
| 2002/0186699 A1 | 12/2002 | Kwok | 370/401 |
| 2003/0052770 A1 | 3/2003 | Mansfield, Jr. et al. | |
| 2003/0062990 A1 | 4/2003 | Schaeffer, Jr. et al. | 340/310.01 |
| 2003/0071719 A1 | 4/2003 | Crenshaw | 340/310.01 |
| 2003/0103307 A1 | 6/2003 | Dostert | 361/113 |
| 2003/0106067 A1 | 6/2003 | Hoskins et al. | 725/119 |
| 2003/0179080 A1 | 9/2003 | Mollenkopf et al. | 340/310.01 |
| 2003/0224784 A1 | 12/2003 | Hunt et al. | 455/426.2 |
| 2004/0067745 A1 | 4/2004 | Belsak | 455/402 |
| 2004/0085172 A1 | 5/2004 | Cern | 336/174 |
| 2004/0110483 A1 | 6/2004 | Mollenkopf | 455/402 |
| 2004/0135676 A1 | 7/2004 | Berkman et al. | 340/310.01 |
| 2004/0178888 A1 | 9/2004 | Hales | 340/310.01 |
| 2004/0196144 A1 | 10/2004 | Crenshaw et al. | 340/310.01 |
| 2004/0227623 A1 | 11/2004 | Pozsgay | 340/310.01 |
| 2004/0233928 A1 | 11/2004 | Pozsgay | 340/446 |
| 2004/0242185 A1 | 12/2004 | Lee | 455/402 |
| 2005/0007241 A1 | 1/2005 | Kline | 340/310.01 |
| 2005/0046550 A1 | 3/2005 | Crenshaw et al. | 340/310.01 |
| 2005/0057227 A1 | 3/2005 | Rockwell | |
| 2005/0128057 A1 | 6/2005 | Mansfield et al. | 340/310.01 |
| 2005/0164666 A1 | 7/2005 | Lang et al. | 455/282 |
| 2005/0249245 A1 | 11/2005 | Hazank et al. | 370/485 |
| 2006/0017324 A1 | 1/2006 | Pace et al. | |
| 2006/0034330 A1 | 2/2006 | Iwamura | |
| 2006/0072621 A1 | 4/2006 | Macaluso et al. | |
| 2006/0132299 A1 | 6/2006 | Robbins et al. | |
| 2006/0139971 A1 | 6/2006 | Mitsuari | |

FOREIGN PATENT DOCUMENTS

| | | |
|---|---|---|
| EP | 1 213 849 A1 | 6/2002 |
| EP | 1 251 646 A2 | 10/2002 |
| GB | 2 293 950 A | 4/1996 |
| GB | 2 347 601 A | 9/2000 |
| WO | 98/33258 A2 | 7/1998 |
| WO | 02/089352 A1 | 11/2002 |
| WO | 03/30396 A2 | 4/2003 |
| WO | 03/039022 A1 | 5/2003 |
| WO | 04/17621 | 2/2004 |
| WO | 04/102868 | 11/2004 |

OTHER PUBLICATIONS

"Signalling on Low-Voltage Electrical Installations in the Frequency Band 3kHz to 148.5kHz-Part 4: Filters at the Interface of the Indoor and Outdoor Electricity Network", *CLC SC 105A(Secratariat)* May 1992, 62, 1-11.

EMETCON *Automated Distribution System*, ABB Power T & D Company, Inc., Jan. 1990, Raleigh, North Carolina, No B-919A, 14 pages.

"Centralized Commerical Building Applications with the Lonworks ® PLT-21 Power Line Transceiver", *Lonworks Engineering Bulletin*, Echelon, Apr. 1997, pp. 1-22.

Lim, C.K. et al., "Development of a Test Bed for High-Speed Power Line Communications", School of Electrical and Electronic Engineering, Nanyang Technological University, Singapore, *IEEE*, 2000, 451-456.

Sado, WN. et al., "Personal Communication on Residential Power Lines- Assessment of Channel Parameters", Nov. 6-10, 1995, *IEEE*532-537.

LONWORKS Engineering Bulletin, "Demand Side Management with LONWORKS® Power Line Transceivers," Dec. 1996, 36 pages.

Outlook Conference 2004: Amperion Deployment Overview, Primen Conference, May 7, 2004, 10 pages.

\* cited by examiner

METHOD OF ISOLATING DATA IN A POWER LINE COMMUNICATIONS NETWORK

CROSS REFERENCE TO RELATED APPLICATIONS

This application is a continuation-in-part of U.S. patent application Ser. No. 09/765,910, filed Jan. 19, 2001 (CRNT-0008) now U.S. Pat. No. 6,977,578, which is herein incorporated by reference herein, in its entirety, for all purposes. The application also claims priority under 35 U.S.C. § 119(e) to Provisional Patent Application No. 60/177,237 (CRNT-0003), filed on Jan. 20, 2000, which is herein incorporated by reference herein, in its entirety, for all purposes.

INTRODUCTION

The present invention relates generally to the field of electrical communications via power lines. More particularly, the present invention relates to isolating data in a power line communications system.

BACKGROUND OF THE INVENTION

A typical electric distribution configuration has a transformer which steps medium voltage down to a few hundred volts AC (typically between 100 and 240 VAC). The Low Voltage (LV) is fed to several homes.

Referring to FIG. 1, the typical electric power distribution architecture is illustrated. No filter or other barrier is employed to isolate data from one residence to the next. Using this architecture for a power line communications system, typically a power line signal containing the data will be fed at the transformer. There are four potential problems with this topology for communications.

First, the bandwidth is shared between plural subscribers. Second, noise from another subscriber using a different type of power line communication system or noise from another subscriber's appliances may cause interference. Third, subscribers using the same system can interact with each other. Fourth, since one subscriber receives the other subscriber's data, there is a lack of security.

Thus, what is needed is a way of isolating data from subscriber to subscriber to alleviate the problems discussed above.

SUMMARY OF THE INVENTION

The present invention provides isolation between a power line local area network and another network such as a power line wide area network. In one embodiment of the present invention, a filter device is installed on the power line supplying power to a structure in which a power line local area network is present. The example filter device may comprise a controller configured to receive a control signal and to cause a switch to activate or deactivate a low pass filter for attenuating the data signals.

BRIEF DESCRIPTION OF THE DRAWING

Additional objects and advantages of the present invention will be apparent in the following detailed description read in conjunction with the accompanying drawing figures.

DETAILED DESCRIPTION OF THE INVENTION

According to alternate embodiments, data isolation is accomplished in a centralized manner, in a distributed manner (i.e., at the subscriber), or in a hybrid manner that is a combination of centralized and distributed.

According to one aspect of the invention, a system provides for network communications isolation in a branch line connecting a subscriber device at a subscriber premises to a network. The system includes an electric power distribution transformer, a branch line (connected between the transformer and the subscriber's premises), a low pass filter, and a power line communications router. The low pass filter connected in the branch line at a location adjacent the transformer. The power line communications router is connected to the network and coupled to the branch line at a location adjacent the filter, on the subscriber side of the filter. When the subscriber device is coupled to the branch line, the subscriber device is coupled to the network and is isolated from the transformer by the filter.

Another embodiment of the invention may comprise a network coupler. The network coupler provides network communications isolation in a branch line connected to a subscriber premises through an electric power meter. The network coupler includes a low pass filter and a power line communications repeater. The low pass filter is coupled to the branch line adjacent to the power meter. The power line communications repeater is connected to the branch line across the low pass filter.

On the one hand, the power line communications repeater is connected across both the low pass filter and the power meter. In the alternative, the power line communications repeater is connected across only the low pass filter. The low pass filter is disposed either on the subscriber side of the power meter, or on the transformer side of the power meter.

According to yet another aspect of the present invention, a network isolator provides network communications isolation in a branch line connected to a subscriber premises through an electric power meter. The isolation is provided between a network located at the subscriber premises and a transformer connected to the branch line. The network isolator includes a low pass filter. The low pass filter is coupled to the branch line adjacent to the power meter. The low pass filter is disposed either on the subscriber side of the power meter, or on the transformer side of the power meter.

Figure 1:
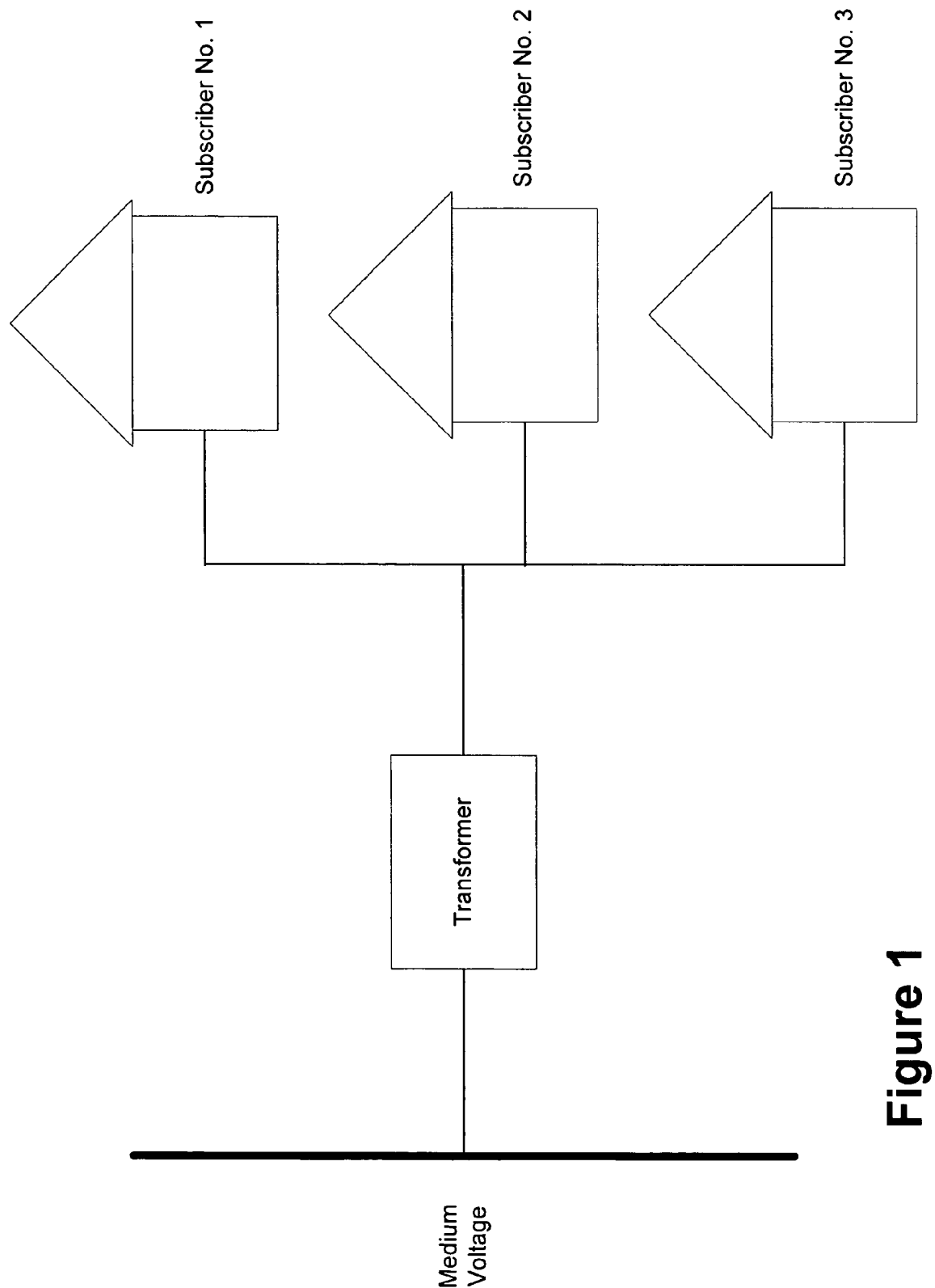
FIG. 1 illustrates a conceptual view of a typical electric distribution topology.
Figure 2:
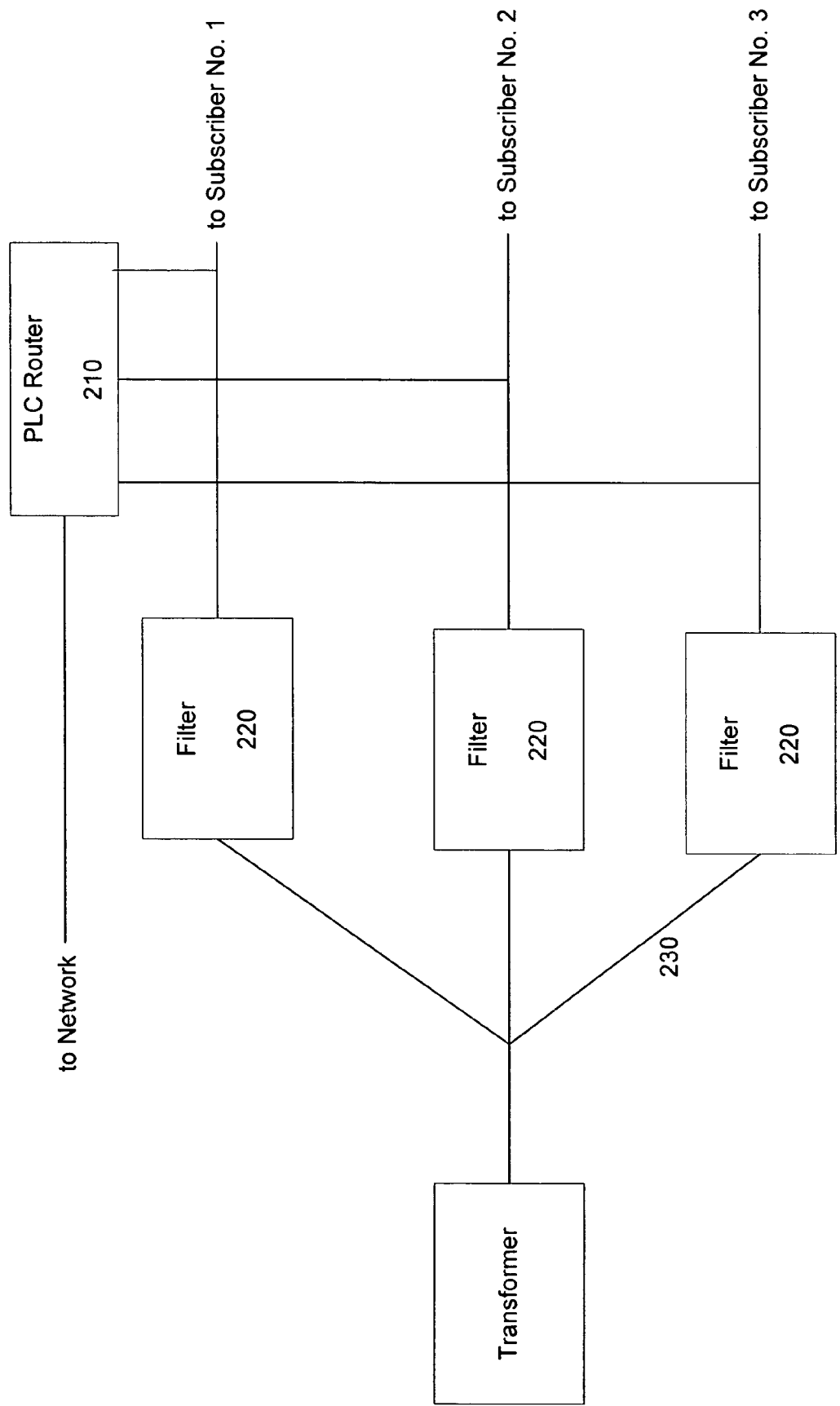
FIG. 2 illustrates a block diagram view of centralized data isolation.

Referring to FIG. 2, a centralized power line communications (PLC) router 210 is illustrated. The centralized PLC router 210 is connected separately to each branch line, which in turn connects to the subscriber. A filter 220 passes the high power electricity (100 VAC to 240 VAC) but blocks the power line communications signal. This filter 220 is implemented using electronic components such as inductors, capacitors and resistors.

This method requires splicing the electric power line and inserting the filter 210 in series with the line 230.

A less expensive way of implementing this filter, which does not require cutting the power line, uses a ferrite toroid as a common-mode choke. This is done by simply feeding an electric power line through a toroid, thus allowing the electric power (50–60 Hz) to pass yet blocking the higher frequency signals that contain the power line communications data. In most situations the toroid method is preferred.

In conjunction with the centralized method, or as an alternative, data is isolated using a distributed approach. In this approach a filter (such as described above) is placed at the subscriber's location. A power line data repeater, which regenerates the data, is connected in parallel with the filtering device. This topology addresses the noise, interference and security issues. However, the bandwidth is shared between each subscriber connected to the transformer.

Figure 3:
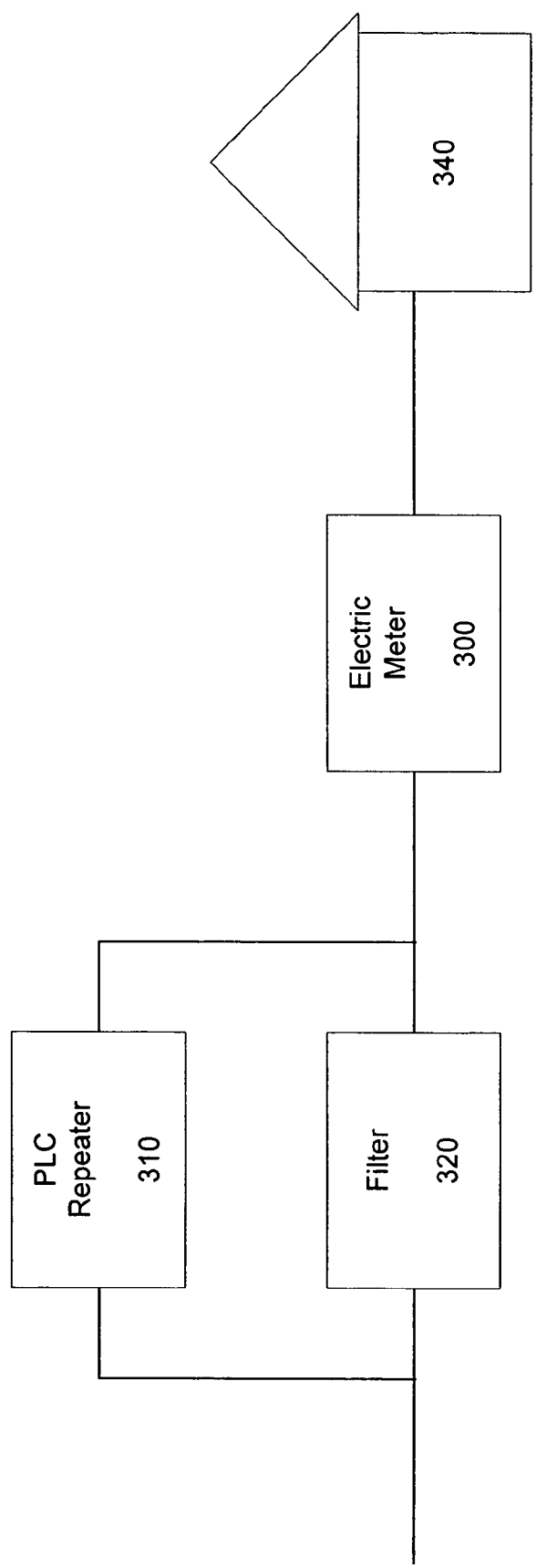
FIG. 3 illustrates a block diagram view of an embodiment of the present invention having isolation before the power meter.

Referring to FIG. 3 a block diagram view of an embodiment of the present invention having isolation before the power meter 300 is illustrated. This is an implementation according to a distributed topology. A PLC repeater 310 and a filter 320 are connected in parallel with one another and in series with the power meter 300. The power meter 300 is disposed between the subscriber's house 340 and the PLC repeater 310.

Figure 4:
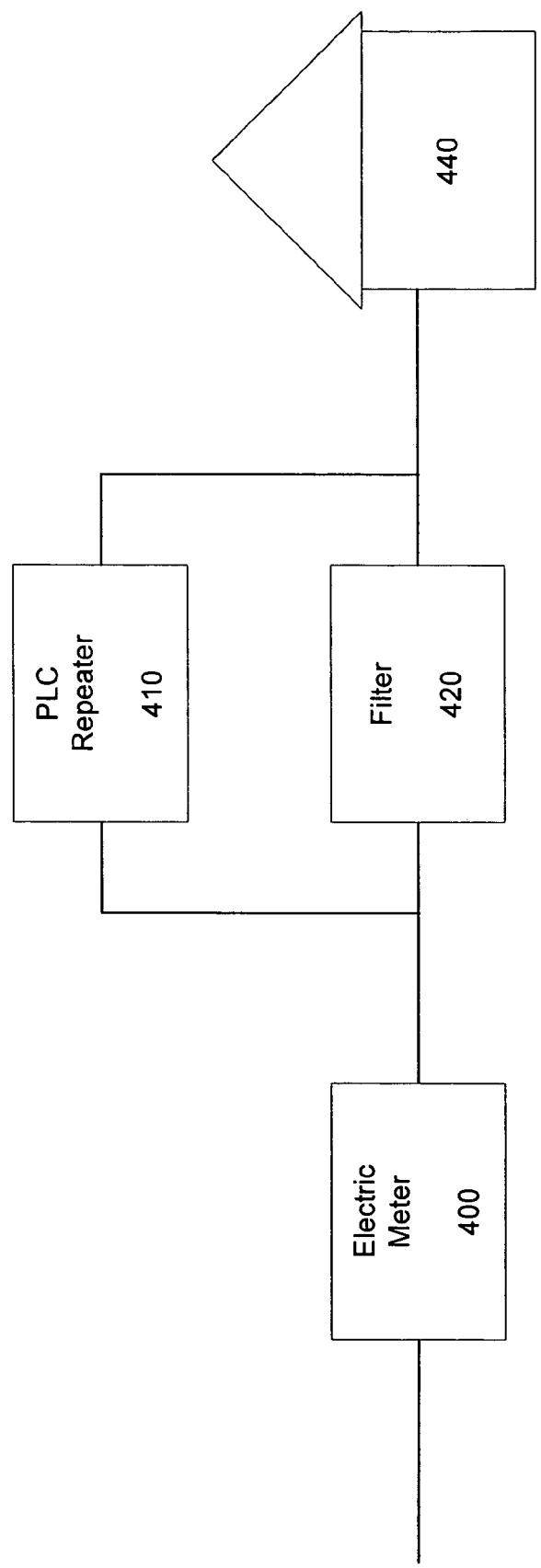
FIG. 4 illustrates a block diagram view of an embodiment of the present invention having isolation after the power meter.

Referring to FIG. 4 a block diagram view of an embodiment of the present invention having isolation after the power meter 400 is illustrated. This is another implementation according to a distributed topology. A PLC repeater 410 and a filter 420 are connected in parallel with one another and in series with the power meter 400. The PLC repeater 410 is disposed between the subscriber's house 440 and the power meter 400.

Functionally, the differences between the distributed topology implementations illustrated in FIGS. 3 & 4 are insubstantial. However, depending on the deployment one may be easier to implement than the other.

Figure 5:
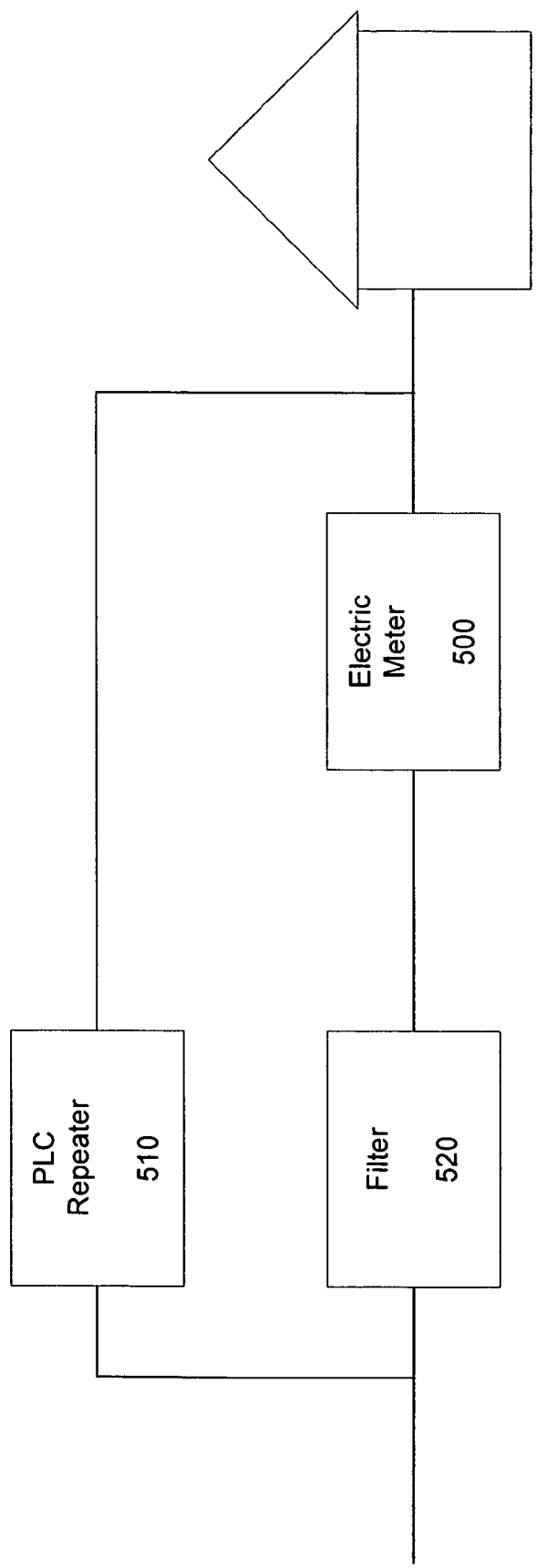
FIG. 5 illustrates a block diagram view of an embodiment of the present invention having isolation bridging the power meter.

Referring to FIG. 5, a block diagram view of an embodiment of the present invention having isolation bridging the power meter is illustrated. A filter 520 is connected in series with the power meter 500, and that series combination is connected in parallel with a PLC repeater 510.

Although the distributed topology of this embodiment is potentially difficult to deploy, it has certain performance advantages. Performance according to this embodiment is superior since the electric meter 500 presents some attenuation of the power line communication signals. Thus, in this topology the PLC repeater 510 repeats signals across the filter 520 and electric meter 500. This achieves a better signal-to-noise ratio by avoiding the attenuation that would otherwise be introduced by the electric meter 500.

Figure 6:
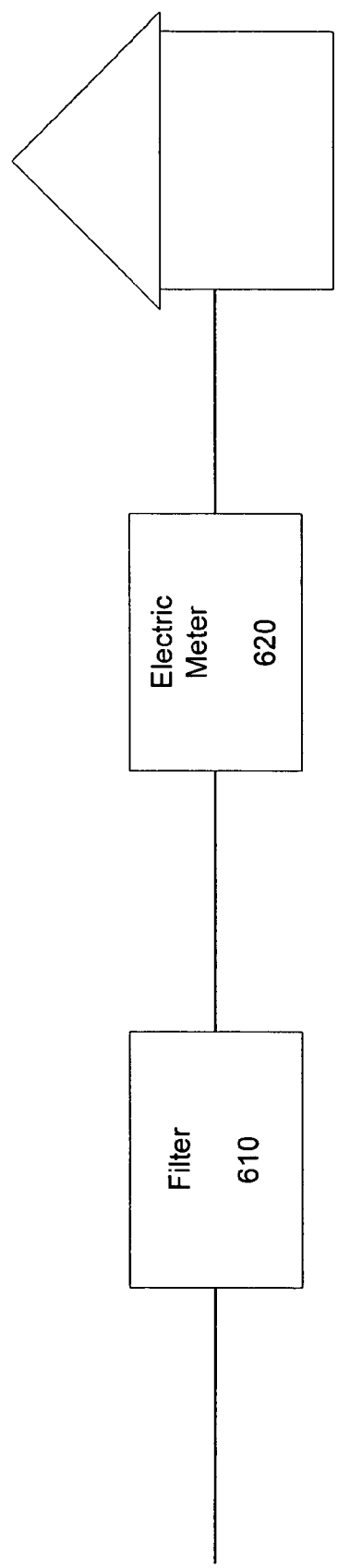
FIG. 6 illustrates a block diagram view of an embodiment of the present invention having a LAN only topology with a filter before the meter.
Figure 7:
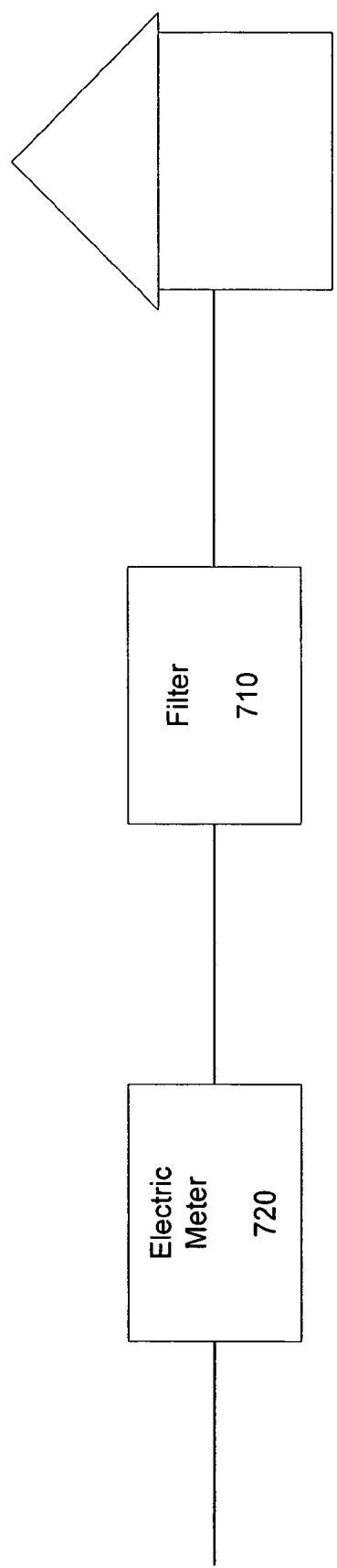
FIG. 7 illustrates a block diagram view of an embodiment of the present invention having a LAN only topology with a filter after the meter.

Referring to FIGS. 6 & 7, a filtering device is placed on the power line adjacent the subscriber's premises. This is useful in cases where an internal Local Area Network (LAN) exists within the premises and access to a Wide Area Network (WAN) in not required. This provides security for the LAN as well as reduces interference from the outside. It also isolates the LAN from the WAN in case a WAN is deployed. According to the embodiment illustrated in FIG. 6, the filter 610 and the electric meter 620 are connected in a serial with one another, with the filter 610 before the electric meter 620. Alternatively, FIG. 7 illustrates the filter 710 and the electric meter 720 as being connected in a serial with one another, with the filter 710 placed after the electric meter 720. The arrangement according to both of these illustrated topologies functionally perform the same. However, depending on the deployment one may be easier to implement than the other.

The WAN may be formed, at least in part (e.g., locally) of a power line communications system that provides access to the Internet for its subscribers. A detailed description of an example PLCS, its components and features, including but not limited to a bypass device that communicatively couples to the low voltage power lines, is provided in U.S. patent application Ser. No. 10/641,689 filed Aug. 14, 2003, entitled "Power Line Communication System and Method of Operating the Same," which is hereby incorporated by reference in its entirety. The power line communications system (PLCS) may communicate over all of the low voltage power lines coupled to the distribution transformer, which are collectively referred to herein as the low voltage subnet. There may be ten or more homes receiving power via a separate low voltage power lines that typically are connected at a juncture near the transformer. Consequently, as discussed above, all the low voltage power lines coupled to a particular distribution transformer will be electrically coupled together. A Homeplug TM network (e.g., Homeplug 1.0, or AV) or other power line LAN in a home, office building or other structure may impact the performance of the WAN on that low voltage subnet. In other words, the power line LAN data signals egressing from the structure via the LV supply power line may be received by the WAN devices connected to the LV supply power lines of the same distribution transformer such as user devices of subscribers of the PLCS service or power line communications devices external to the home (e.g., coupled to the power line). The power line LAN data signals may be received by such devices as noise, received as non-decryptable data, or received but not addressed for the WAN device and therefore ignored (e.g., after being demodulated). In these instances and others, the LAN data signals egressing from the structure on the LV power line may slow communications between the WAN (e.g., PLCS) devices, reduce the bandwidth available to the WAN on the LV subnet, and/or increase communications errors in the WAN. Similarly, the ingress of WAN data signals from the WAN into the structure over the supply power lines will slow communications between the power line LAN devices, reduce the bandwidth available on the internal power lines, and/or increase communication errors on the LAN.

Thus, the filter device of the present invention can prevent such degradations of both networks. As discussed, the filter device or filter thereof may be a low pass filter formed of capacitors, inductors, and/or resistors. In addition, the filter device or filter thereof may be a toroid filter, which is comprised of one or more magnetically permeable toroids that may be disposed in a housing having a first portion and a second portion that couple together via a hinge. The toroids may be comprised of a first portion and a second portion with each portion in a respective portion of the housing. The housing (and toroid portions therein) is clamped around the power line at an appropriate location as discussed herein. An example of such a enclosure for housing such toroids is provided in U.S. patent application Ser. No. 10/176,500, entitled "Power Line Coupling Device And Method Of Using The Same," filed Jun. 21, 2002 (CRNT-0081), which is herein incorporated by reference herein, in its entirety, for all purposes.

Figure 8:
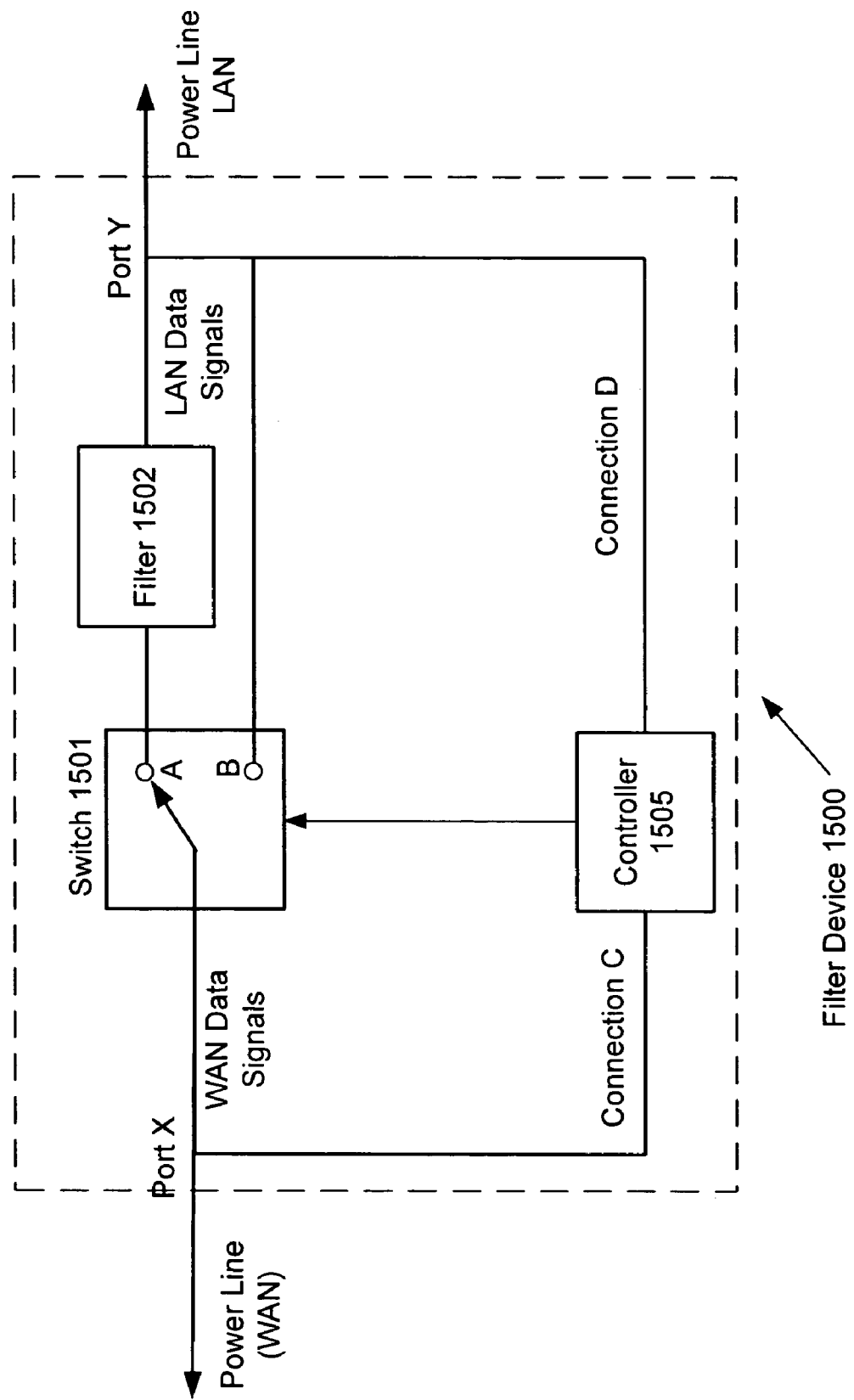
FIG. 8 illustrates a block diagram of an example embodiment of a filter device, according to the present invention.

As shown in FIG. 8, one example embodiment of a filter device 1500 may have a switch 1501. The switch 1501 allows the device 1500 to transition between an active (filtering) mode and an inactive (not filtering) mode so that if a power line LAN user wishes to subscribe to or use the WAN (e.g., PLCS), the filter can be "deactivated" simply by actuating the switch 1501, without the need to uninstall the device 1500.

Thus, the switch 1501 may have a first configuration in which the device is in active mode in which the filter 1502 is filtering (i.e., attenuating data signals). The switch 1501 may have a second configuration in which the device 1500 is in inactive mode in which the filter 1502 is not filtering. Placing the device 1500 in inactive mode may comprise changing the value of one or more components that form part of the filter circuitry (e.g., to change the filter characteristics) such via a transistor circuit. An inactive mode may alternately be achieved by shunting the data signals, and possibly the power signals, around the filter 1502 as shown in FIG. 8. In other words, in this embodiment, in the inactive mode the filter 1502 is removed from the path of the data and power.

As shown in FIG. 8, the switch 1501 may receive an input from a controller 1505, which may receive an input via a wireless link or via the low voltage power lines to which the filter device 1500 is attached. Thus, a PLCS network device, such as a bypass device mounted near a distribution transformer and communicatively coupled to the low voltage power line(s), may transmit a control signal to the filter device 1500 via the low voltage power line. As shown in FIG. 8, upon receipt of the control signal via connection C, the controller 1505 in the device 1500 may provide a signal to the switch 1501 to transition to the appropriate mode or configuration (active or inactive) or to simply toggle (i.e., to switch modes irrespective of the present configuration). Alternately, the control signal may be transmitted from a power line LAN device in the structure to the filter device 1500, which is received by the controller 1505 via connection D. For example, if the user is not using the WAN and/or is communicating very confidential data over the power line LAN in the structure, the user may wish to isolate the LAN data from the WAN. Consequently, the user may provide an input to a home computer, which responds by executing one or more computer code segments (a computer program) which causes the computer to transmit (or cause a secondary device to transmit) the control signal to the filter device 1500. The switch 1501 may comprise a transistor, transistor circuit, a relay, and/or multiple relays. The switch 1501 and controller 1505 may also be integrated into a single device (e.g., an integrated circuit). Alternately, the switch 1501 may be a manual switch actuated via a user manually.

Thus, the filter device 1500 of FIG. 8 may receive a control signal from both a WAN device and a LAN device. In an alternate embodiment, it may not be desirable to allow the power line LAN user to change the mode of the filter device 1500 in which case connection D of the filter device 1500 of FIG. 8 may be omitted. In another alternate embodiment, it may be desirable to allow the LAN user (and not the WAN devices) to change the mode in which case connection C of the filter device 1500 of FIG. 8 may be omitted.

The signal transmitted may be any suitable control signal for which the device is configured to receive and respond to (e.g., by activating or deactivating the filter 1502). The device 1500 may or may not send a response such as an acknowledgment. Thus, the control signal transmitted may be a internet protocol (IP) packet transmitted according to a Homeplug standard. Thus, the device 1500 (and its controller) may further comprise a demodulator (or a full modem chip set) for receiving the signal and processing the control signal. In addition, the filter device may comprise an input filter and amplifier for amplifying and filtering one or more frequency bands in which the control signal may be sent or modulated. In addition, the filter device may comprise a network address (WAN address, LAN address, or both) and only respond if the address in the received control signal corresponds to the address of the filter device 1500. Because numerous structures may receive power via a separate low voltage supply power line, (all of which may be connected near the transformer), a separate filter device 1500 may be installed on each low voltage power line supplying power to the plurality of structures. In addition, if the filtering devices 1500 are addressable, each filtering device may be individually controlled via a local PLCS WAN device (e.g., the PLCS bypass device coupled to the LV power lines) or remotely (e.g., a power line server or other device that transmits the control signal to the filter device 1500 via the Internet and PLCS).

The control signal sent may comprise a portion of the frequency band used by the LAN, the WAN, or both. Alternately, the control signal may comprise a lower frequency pulse or tone in one or more frequencies that are not in the frequency band used by the LAN or WAN. For example, the control signal could comprise a 500 Hz tone for a duration of one second to which the filter device 1500 responds by toggling the filter's mode (inactive or active). Alternately, first and second tones of different frequencies (e.g., 500 Hz and 600 Hz respectively) may each comprise a control signal indicating a command to activate or deactivate the filter, respectively. Alternately, each filter device 1500 may be configured to receive a different frequency, thereby being addressable via use of a particular frequency tone or set of tones. While these example low frequencies are higher than the 60 Hz power signal frequency, they are much lower than the megahertz frequencies used by the Homeplug standard and protocols for other typical broadband communications. If a control signal has a frequency that is also used by the WAN or LAN, the filter device must be able to receive the signal when the filter is active (filtering out that frequency). Consequently, it may be desirable to configure the controller 1505 (that may comprise a receiver) of the filter device 1500 so that it may receive the control signal even when the filter device is in the active mode as in the example embodiment shown in FIG. 8.

The embodiment may be stand alone devices or may be integrated into, or form part of, another device such as a power meter. For example, some power meters include, or are easily modified to include, a power line modem (e.g., a Homeplug modem), which with appropriate hardware and software and interfacing could act as the controller or the receiver portion of the controller.

In the United States, the low voltage power line typically includes a neutral conductor and two conductors carrying current ("energized conductors"). The two energized conductors typically carry about 120V alternating current (AC) at a frequency of 60 Hz and are 180 degrees out of phase with each other.

The high frequency data signals will often couple from one conductor to another. In other words, after a short distance from the point of transmission, data that is communicated onto one energized conductor will be present on both energized conductors and perhaps on the neutral conductor as well. The amount of coupling is related, in part, to the distance between the conductors, their diameter, and the power and frequency of the signal. In addition, some PLCS devices (e.g., WAN devices external to the structure) transmit data on both energized conductors (e.g., differentially). Consequently, for any of the above reasons or other reasons, and irrespective of whether the data signals are transmitted from the LAN or WAN, the data signals often may be present on both energized conductors of the LV power line and may also be present on the neutral conductor. Thus, it may be desirable to install a filter device on both energized conductors (or all energized conductors in the event there are more than two). In addition, it may be desirable to install a filter device on any neutral conductors that couple the WAN to the LAN. Thus, it may be desirable to install a filter device on the conductors coupled to both the WAN and LAN.

Thus, alternate embodiments may comprise two or three filter devices in one housing. Such an embodiment may comprise only one controller that actuates a switch in line with each conductor to control the mode and activation of the filter. Alternately, a separate filtering device may be installed on each conductor.

As discussed above, high frequency data signals couple between parallel conductors. Consequently, depending on the frequencies of communication and the structure and relative positions of the conductors, the data signals may couple from one conductor to another conductor and bypass the filter in the filter device. To reduce the likelihood of the data signals bypassing the filters in such a manner, it may be advantageous to place the filter device on each of the multiple conductors so that they are substantially in parallel with each other. In other words, placing the filters along an axis that is substantially perpendicular to the longitudinal axis of the substantially parallel low voltage power line conductors may increase the effectiveness of the filters. This may be accomplished by disposing each filter in the same housing. Alternately, it may be advantageous to dispose each filtering device in a separate housing and to form the housing from a conductive material and, perhaps, to conductively connect the conductive housings to ground. In this embodiment, the housings would not be connected to the conductors.

Figure 9:
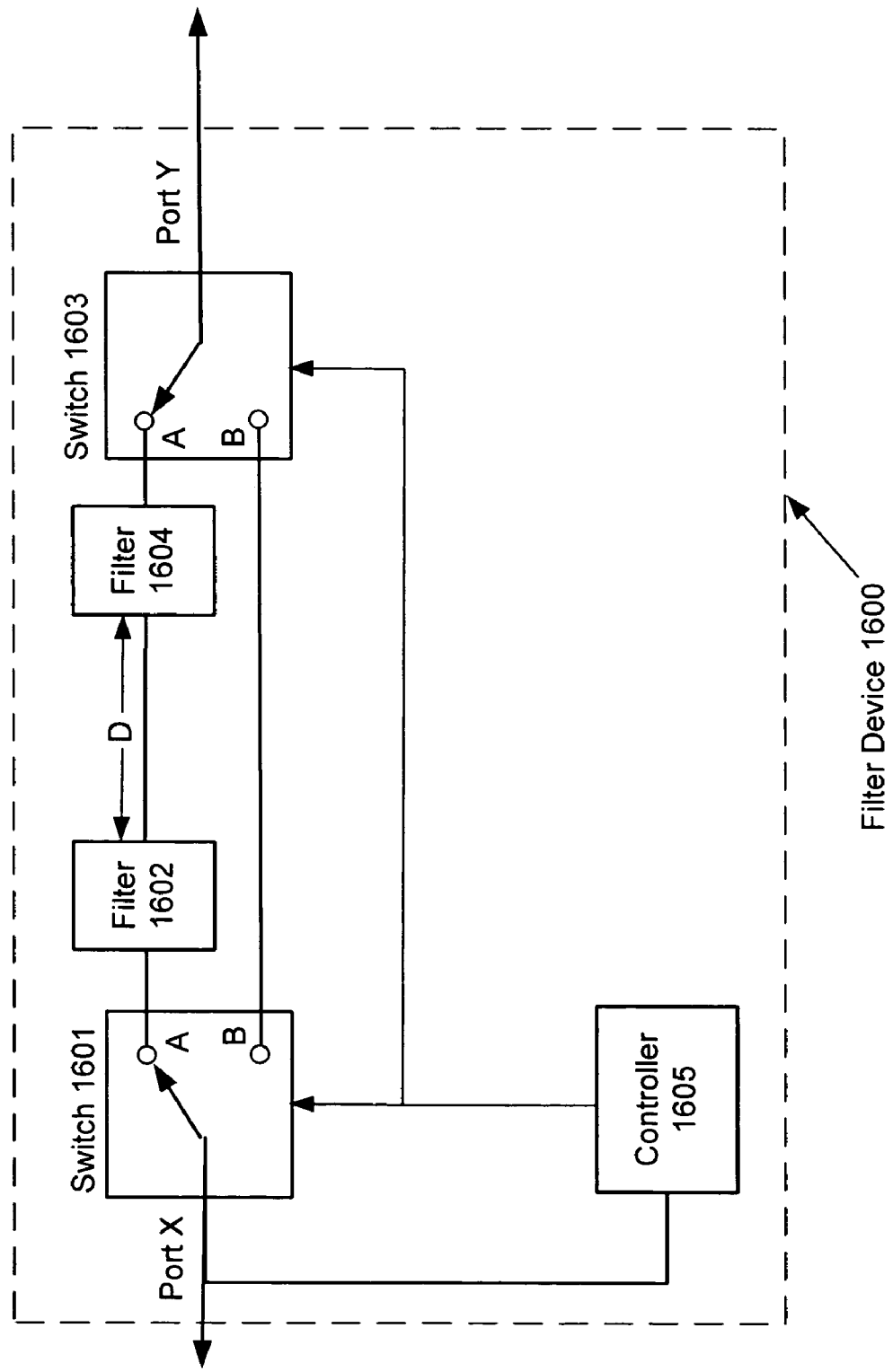
FIG. 9 illustrates a block diagram of another example embodiment of a filter device, according to the present invention.

In another embodiment of a filtering device shown in FIG. 9, the filter device 1600 may comprise a first switch 1601 and first filter 1602 near a first port (e.g., Port X) and a second switch 1603 and second filter 1604 near a second port (e.g., Port Y). The filters 1602 and 1604 may be separated by a distance D so that there is a gap or space along the conductor providing the power signal path where there are no data signals present. Some of the embodiments, for example as illustrated in FIG. 8, may have a discontinuity in the path of the data signals. The gap of the filter device 1600 in FIG. 9 reduces the likelihood of the data signals coupling around the filters 1602, 1604. Thus, installing the filter device 1600 of FIG. 9 on multiple conductors may provide increased attenuation of the data signals that might otherwise couple among conductors. The distance D of the gap between the filters may be proportional to the wavelength of one or more of the frequencies used by the WAN or LAN. For example, the distance D may be approximately five percent, ten percent, or twenty percent of the wavelength of the highest frequency used by the power line LAN.

As will be evident to those skilled in the art, the filters herein may be bi-directional filters to prevent both the ingress and egress of data signals to and from the structure.

Figure 10A:
FIGS. 10a–c illustrates a example filters that may form part of an embodiment according to the present invention.
Figure 10B:
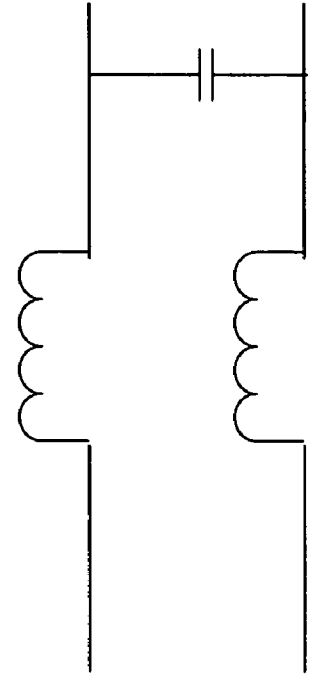
Figure 10C:
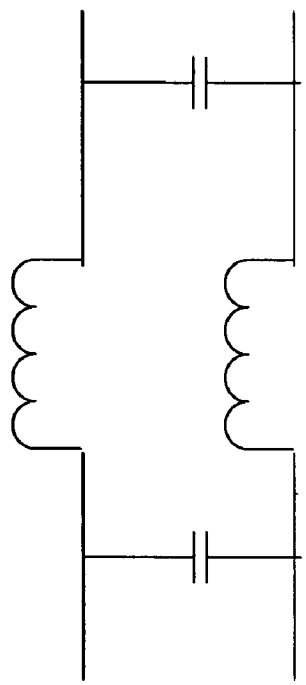

As shown in FIG. 10a, the filter in any of the embodiments may be an inductor in series with the power line conductor. The filter may also comprise a capacitor to the ground or neutral conductor. In the instance where there are two or more energized power lines, the filters may comprise an inductor in series with each energized conductor and a first capacitor connecting the first energized conductor to the second energized conductor on a first side of the inductors as shown in FIG. 10b. In addition, there may also be an inductor in series with the neutral and a second capacitor connecting the neutral to the first energized conductor and a third capacitor connecting the neutral to the second energized conductor. In addition, the filter may comprise a fourth capacitor coupling the first energized conductor to the second energized conductor on the second side of their inductors as shown in FIG. 10c. Furthermore, the filters may comprise a fifth and sixth capacitor connecting the neutral to the first and second energized conductors, respectively. The fifth and sixth capacitors may be couple to the neutral and energized conductors at the opposite side of their respective inductors to which the first, second, and third capacitors connect. The connection of the filter to the neutral (or ground) or other energized conductor is not shown in figures and the filter is not so limited. Any suitable filter circuitry may be used including, but not limited to those described above, a Butterworth low pass filter (which may a first order or second order filter) or other low pass filter or band pass filter. Thus, a first order, second order, third order, or other filter may be used.

It should be appreciated that absolute blocking of the data signals may not be necessary. Attenuating a high or moderate percentage of the energy of the data signals may be sufficient to eliminate communication problems or increase performance sufficiently—even though some degradation may still occur, albeit less performance degradation (e.g., less frequently, fewer errors, less bandwidth degradation, and/or less latency) than without any attenuation (or only attenuation of a power meter if provided thereby).

In general, the filter devices may be installed anywhere along the LV power line that supplies power to the structure (i.e., the supply power line) such as between 1) the juncture of the supply power line with the supply power line of any of the other structures; and 2) the point at which the supply power line connects to the electric distribution network of the structure (e.g., up to and inside the circuit breaker box). In one embodiment, the filter device may be installed in a circuit breaker box and potentially integrated into the structure's main circuit breaker. Installation may then entail simply replacing the main circuit breaker with a new circuit breaker having the integrated filter device. The filter devices also may be installed at a mole along an underground low voltage supply power line or very near the juncture of the supply power lines (e.g., and mounted to the utility pole).

Figure 11:
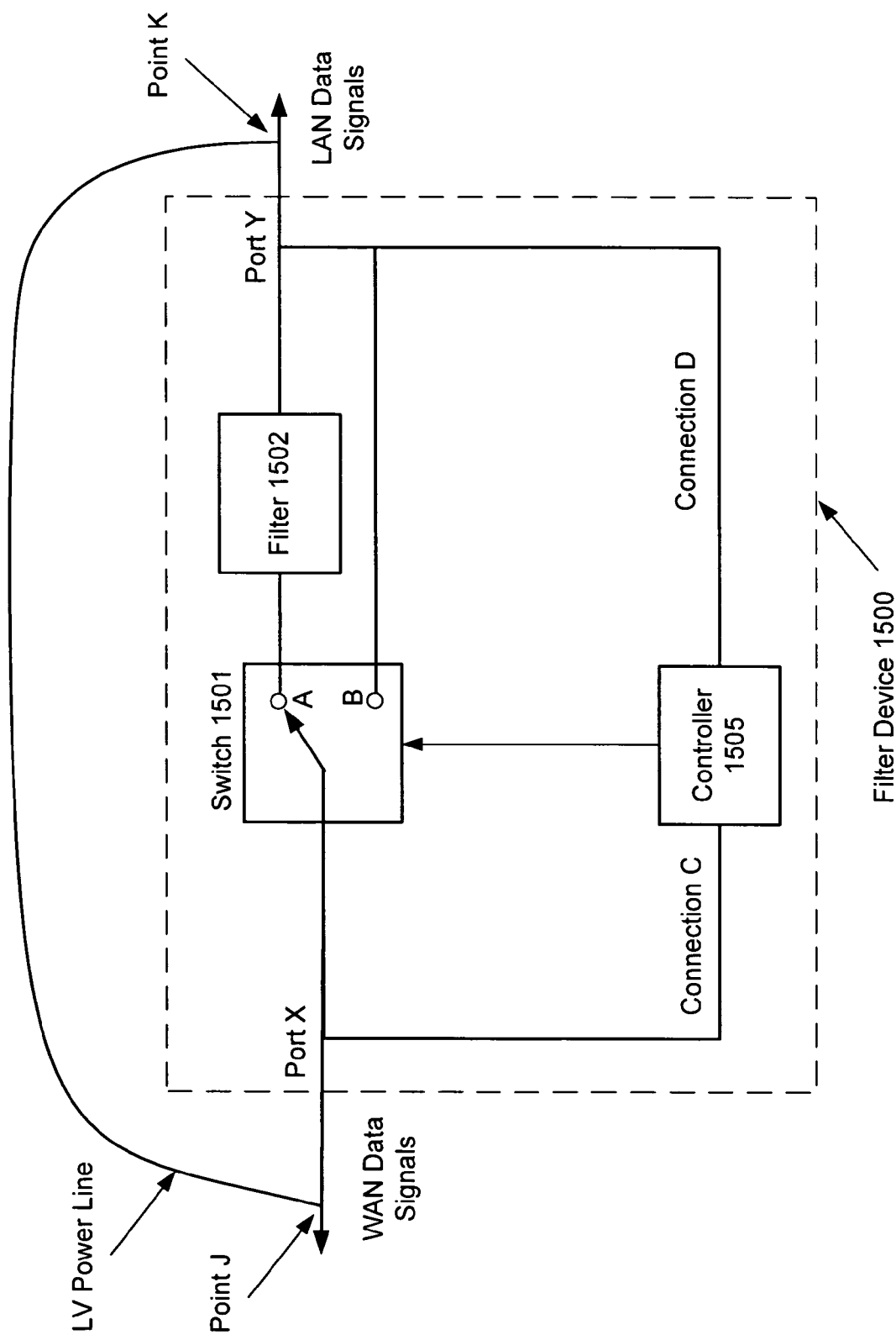
FIG. 11 illustrates a block diagram of an example embodiment of a partially installed filter device, according to the present invention.

The filter devices of the example embodiments are in-line with the low voltage supply power line(s). Consequently, installing the filter device could include cutting low voltage power conductor(s), which can be disruptive to electric power customers. One method of installing the device without disrupting power is to first connect a first port of filter device to the low voltage power line. For example and as shown in FIG. 11, Port X may be electrically connected to the power line at Point J along the power line conductor. Second, Port Y may be electrically connected to the power line conductor at Point K along the power line conductor. Power may now flow through the filter device (and the power line). Next, the power line may be severed somewhere between Point J and Point K (e.g., perhaps near both points), thereby forcing power (and data) to flow through the filter device 1500. Thus, the device may be installed without disconnecting power from structure. This method of installation may be used with any of the embodiments of the present invention for which the installation method is applicable.

In another embodiment, the filter device is disposed in a housing having a first portion and a second portion that are coupled together via a hinge. To install the filter device, the housing is clamped around the supply power line at an appropriate location. The clamping of the housing may substantially simultaneously connect the filter device and severs the power line conductor(s). The connection of the filter device may occur slightly before severing of the power line conductor(s) or substantially simultaneously. In either case, the power customer should experience no, or minimal, interruption of electric service. Thus, the housing of this embodiment may comprise a severing mechanism (to sever the power line) and a crimping mechanism (to connect the filter device) on each end of the housing. Mechanisms that both cut and crimp connectors onto conductors in one action are well known in the art and therefore a detailed description is not provided herein.

In some instances, a PLCS may provide adequate performance without an attenuator even if competing with the power line LAN for the LV subnet. However, the PLCS network element (e.g., a transformer bypass device) communicating through the LV subnet may perform performance testing to determine if a power line LAN is present in any of the structures coupled to the LV subnet. The performance testing may be accomplished by periodically communicating with a PLCS subscriber and detecting substantial or partial degradations in communication speeds, bandwidth, or increases in error rates. If a performance testing suggests that a power line LAN is likely to be present, the PLCS network device may automatically transmit a notification to a central computer (e.g., a power line server described in the incorporated reference) to initiate installation of filter devices in the LV power lines of one or more of the non-PLCS subscribers or on all of the LV power lines coupled to the PLCS network device.

Alternately, if filtering devices are already installed, it may be desirable to sequentially deactivate each filter to perform performance testing. If the performance testing suggests that a power line LAN is likely to be present, the PLCS network device may automatically transmit a notification to a central computer (e.g., a power line server) to initiate a marketing campaign to market the PLCS service.

In one example embodiment, the bypass device of the incorporated reference may be configured to transmit the control signals. In other examples PLCSs, the signal may be transmitted through the distribution transformer to the customer location (e.g., with or without a repeater on the low voltage power line). Thus, the invention is not limited to a particular PLCS, PLCS architecture, or topology.

The present invention has been described in terms of preferred embodiments, however, it will be appreciated that various modifications and improvements may be made to the described embodiments without departing from the scope of the invention.

What is claimed is:

1. A method of providing isolation for a power line local area network (LAN) that communicates data over one or more internal power lines of a first structure, the one or more internal power lines being electrically connected to a first external supply power line supplying power to the first structure, the first external supply power line forming part of an electric power distribution system and being electrically connected to a second external supply power line that supplies power to a second structure, the method comprising:

establishing a wide area network comprising the second external supply power line; and attenuating a data signal traversing the first external supply power line to thereby substantially prevent the data signal from entering the first structure.

2. The method of claim 1, wherein the attenuating is achieved via an attenuation device that has an activate mode in which the attenuation device attenuates data signals and an inactivate mode in which the attenuation device does not substantially attenuate data signals.

3. The method of claim 2, further comprising:

receiving a control signal; and transitioning from the active mode to the inactive mode in response to receiving the control signal.

4. The method of claim 3, wherein the control signal comprises address information.

5. The method of claim 4, wherein the control signal is received via a signal set substantially compliant with a Homeplug standard.

6. The method of claim 3, further comprising transmitting the control signal from a WAN network element.

7. The method of claim 3, further comprising transmitting the control signal from a LAN device.

8. The method of claim 2, wherein said attenuation device comprises a manual switch actuable to transition the attenuation device from the active mode to the inactive mode.

9. The method of claim 1, further comprising cutting the first supply power line and coupling a low pass filter to the supply power line.

10. The method of claim 1, wherein the first supply power line comprises a first energized conductor, a second energized conductor, and a neutral conductor, and further comprising:

cutting the first energized conductor;

cutting the second energized conductor; and coupling a low pass filter to the first and second energized conductor.

11. The method of claim 10, wherein:

the low pass filter comprises a first low pass filter coupled to the first energized conductor;

a second low pass filter coupled to the second energized conductor; and wherein the first low pass filter is not electrically connected to the second low pass filter.

12. The method of claim 10, wherein the low pass filter comprises an inductor in series with energized conductor and a capacitor connecting the first energized conductor to the second energized conductor.

13. The method of claim 12, wherein the low pass filter further comprises a capacitor connecting the first energized conductor to the neutral.

14. The method of claim 10, wherein the low pass filter comprises a capacitor connecting the first energized conductor to the neutral.

15. The method of claim 1, wherein the first supply power line comprises an energized conductor, further comprising:

connecting a first port of the data signal attenuator to the energized conductor at a first point along the energized conductor; followed by connecting a second port of the data signal attenuator to the energized conductor at a second point along the energized conductor; and followed by cutting the energized conductor between the first point and the second point.

16. The method of claim 1, wherein the attenuating is accomplished by an attenuator disposed in a power meter.

17. The method of claim 1, wherein the attenuating is accomplished by a high frequency attenuator in a circuit breaker box.

18. The method of claim 1, wherein the attenuating is accomplished by a first filter and a second filter electrically connected together, at least in part, by a conductor.

19. The method of claim 18, wherein the first filter and the second filter are physically separated from each other by distance at least five percent of a wavelength of a frequency used to communicate data signals on the LAN.

20. The method of claim 1, wherein the attenuating is accomplished by an attenuation device that comprises a data filter and a modem.

21. A method of providing isolation for a power line local are network (LAN) that communicates data over one or more internal power lines of a first structure, the one or more internal power lines being electrically connected to a low voltage subnet that comprises a first external supply power line supplying power to the first structure and a second external supply power line that supplies power to a second structure and forms part of a wide area network (WAN), the second external supply power line being electrically connected to the first external supply power line, the method comprising:

communicatively coupling a power line communications device to the low voltage subnet; and providing an isolation device on the first external supply power line to isolate the LAN from the WAN; and wherein the isolation device comprises a data signal attenuator.

22. The method of claim 21, further comprising transmitting a control signal from the power line communications device to the isolation device to cause the data signal attenuator to not attenuate data signals.

23. The method of claim 22, further comprising transmitting a control signal from the power line communications device to the isolation device to cause the data signal attenuator to attenuate data signals.

24. The method of claim 21, further comprising transmitting a control signal from the power line communications device to the isolation device to cause the data signal attenuator to attenuate data signals.

25. The method of claim 21, wherein the isolation device comprises a switch and a controller configured to control the switch.

26. The method of claim 25, wherein the isolation device comprises a modem.

27. The method of claim 26, wherein the modem comprises a Homeplug compatible modem.

28. The method of claim 21, wherein the isolation device comprises a modem.

29. The method of claim 21, wherein providing the isolation device comprises cutting the first supply power line and coupling the isolation device in series with the first supply power line.

30. The method of claim 21, wherein the first supply power line comprises a first energized conductor, a second energized conductor, and a neutral conductor and providing the isolation device comprises:

cutting the first energized conductor;
cutting the second energized conductor; and
coupling the data signal attenuator to the first and second energized conductor.

31. The method of claim 30, wherein:
the data signal attenuator comprises a first low pass filter coupled to the first energized conductor;
a second low pass filter coupled to the second energized conductor; and
wherein the first low pass filter is not electrically connected to the second low pass filter.

32. The method of claim 30, wherein the data signal attenuator comprises an inductor in series with energized conductor and a capacitor connecting the first energized conductor to the second energized conductor.

33. The method of claim 32, wherein the data signal attenuator further comprises a capacitor connecting the first energized conductor to the neutral.

34. The method of claim 30, wherein the data signal attenuator comprises a capacitor connecting the first energized conductor to the neutral.

35. The method of claim 21, wherein the first supply power line comprises an energized conductor and providing the isolation device comprises:

connecting a first port of the data signal attenuator to the energized conductor at a first point along the energized conductor; followed by connecting a second port of the data signal attenuator to the energized conductor at a second point along the energized conductor; and followed by cutting the energized conductor between the first point and the second point.

36. The method of claim 21, wherein the isolation device is disposed in a power meter.

37. The method of claim 21, wherein providing the isolation device comprises installing a high frequency attenuator in a circuit breaker box.

38. The method of claim 21, wherein the data signal attenuator comprises a first filter and a second filter electrically connected together, at least in part, by a conductor.

39. A device for attenuating data signals traversing a power line, comprising:

a first port;
a second port;
a first data signal attenuator communicatively coupled to said first port;
a switch having a first state and a second state, wherein said first state of said switch connects said first port to said second port via said first data signal attenuator, and wherein said second state of said switch connects said first port to said second port via a path that does not comprise said first data signal attenuator; and
wherein said first port and said second port are configured to be coupled to the power line so that at least a portion of said first data attenuator is in series with the power line when said switch is in said first state.

40. The device of claim 39, further comprising:
a controller operable to control the state of said switch.

41. The device of claim 40, further comprising a receiver in communication with said controller and configured to receive a control signal indicating a request for the first state.

42. The device of claim 39, further comprising a receiver in communication with said switch and configured to receive a control signal indicating a request for the first state.

43. The device of claim 42, wherein said receiver is configured to receive the control signal via the power line.

44. The device of claim 43, wherein said receiver comprises a Homeplug compatible modem.

45. A device for selectively attenuating data signals traversing a power line carrying a power signal, comprising:
   a first port;
   a second port;
   a switch having a first state in which data signals and a power signal traversing between said first port and said second port are not substantially attenuated; and
   said switch having a second state in which data signals traversing between said first port and said second port are substantially attenuated and the power signal is not substantially attenuated.

46. The device of claim 45, further comprising:
   a controller operable to control the state of said switch.

47. The device of claim 46, further comprising a receiver in communication with said controller and configured to receive a control signal indicating a request for the first state.

48. The device of claim 45, further comprising a receiver in communication with said switch and configured to receive a control signal indicating a request for the first state.

49. The device of claim 48, wherein said receiver is configured to receive the control signal via the power line.

50. The device of claim 49, wherein said receiver comprises a Homeplug compatible modem.

* * * * *

UNITED STATES PATENT AND TRADEMARK OFFICE
CERTIFICATE OF CORRECTION

PATENT NO. : 7,176,786 B2
APPLICATION NO. : 10/899926
DATED : February 13, 2007
INVENTOR(S) : Kline et al.

It is certified that error appears in the above-identified patent and that said Letters Patent is hereby corrected as shown below:

On page 2, under item (56), under "U.S. Patent Documents", in column 2, line 18, delete "Hazank" and insert -- Hazani --, therefor.

On page 2, under (56), under "Other Publications", in column 2, line 4, delete "Secratariat" and insert -- Secretariat --, therefor.

On page 2, under item (56), under "Other Publications", in column 2, line 8, delete "Commerical" and insert -- Commercial --, therefor.

On page 2, under item (56), under "Other Publications", in column 2, line 17, delete "IEEE532-537" and insert -- IEEE, 532-537 --, therefor.

In column 1, line 10, before "now" insert -- , --.

In column 4, line 24, after "2003," insert -- Attorney Docket No. CRNT-0178, --.

In column 11, line 25, in Claim 21, delete "are" and insert -- area --, therefor.

Signed and Sealed this

Eighth Day of May, 2007

JON W. DUDAS
*Director of the United States Patent and Trademark Office*